United States Patent

Seitz et al.

[11] Patent Number: 5,205,879
[45] Date of Patent: Apr. 27, 1993

[54] PNEUMATIC VEHICLE TIRE TREAD HAVING TRANSVERSE GROOVES

[75] Inventors: Hans Seitz, Langenhagen; Hagen Trabandt, Sehnde, both of Fed. Rep. of Germany

[73] Assignee: Continental Aktiengesellschaft, Hanover, Fed. Rep. of Germany

[21] Appl. No.: 715,902

[22] Filed: Jun. 14, 1991

[30] Foreign Application Priority Data

Jul. 16, 1990 [DE] Fed. Rep. of Germany ....... 4022615

[51] Int. Cl.$^5$ .............................................. B60C 11/11
[52] U.S. Cl. ................................................. 152/209 R
[58] Field of Search ............ 152/209 R, 209 D, 209 A

[56] References Cited

U.S. PATENT DOCUMENTS 3,858,633 1/1975 Boileau ........................... 152/209 R
4,327,792 5/1982 Landers .

FOREIGN PATENT DOCUMENTS 0246996 11/1987 European Pat. Off. ........ 152/209 R
3522967 1/1987 Fed. Rep. of Germany ... 152/209 R
0275407 11/1988 Japan .............................. 152/209 R
2-081773 3/1990 Japan .............................. 152/209 B
0617300 7/1978 U.S.S.R. ......................... 152/209 D Primary Examiner—Michael W. Ball
Assistant Examiner—Nancy T. Krawczyk
Attorney, Agent, or Firm—Robert W. Becker & Associates

[57] ABSTRACT

A profiled pneumatic vehicle tire is provided that comprises a tread surface that includes grooves that, when viewed in plan, extend at an angle relative to the circumferential direction of the tire. The grooves have sides that extend at an angle relative to a radial line. The distance between successive grooves in the circumferential direction is modulated in conformity with a pitch sequence that varies the excitation frequency, so that positive profiling portions having varying dimensions in the circumferential direction are provided between the grooves. Not only the dimension of the grooves in the circumferential direction are also modulated in conformity with the pitch sequence, but the tangent of the angle of the sides of the grooves are also modulated in conformity with the pitch sequence.

1 Claim, 2 Drawing Sheets

PNEUMATIC VEHICLE TIRE TREAD HAVING TRANSVERSE GROOVES

BACKGROUND OF THE INVENTION

The present invention relates to a profiled pneumatic vehicle tire having a tread surface that includes grooves that, when viewed in plan extend at an angle relative to the circumferential direction or direction of operation of the tire, with the grooves having sides that extend at an angle relative to a radial line, and with the distance between successive angled grooves in the circumferential direction being modulated in conformity with a design cycle or pitch sequence that varies the excitation frequency, so that positive profiling portions having varying dimensions in the circumferential direction are provided between the inclined groove, with the dimension of the grooves in the circumferential direction being also modulated in conformity with the pitch sequence for the distance between successive grooves.

A tire of this general type is disclosed in U.S. Pat. No. 4,327,792, Landers, which defines the terminology that is also employed in the instant application.

With such pneumatic vehicle tires, the sides of the grooves are angled relative to radial lines in such a way that the grooves widen in a radially outward direction. Such a configuration is intended in particular to enhance the discharge of stones and the like, i.e. the self cleaning effect of the profiling. The angle of inclination of the groove sides is customarily approximately between 5° to 30°. This angular configuration of the groove sides also facilitates the removal of such tires from the vulcanization presses. Up to now, the angling of the sides has been kept as small as possible yet large enough to meet application requirements and the respective tread surface mixture. The angle of the sides has sometimes been varied in the axial direction, but has never been varied in the circumferential direction.

Heretofore known tires of this type have the drawback that their resistance to skidding fluctuates over the periphery. This results in irregular longitudinal and transverse accelerations.

Due to rising demands to lower the noise level, the use of a pitch sequence that varies the excitation frequency cannot be avoided in modern pneumatic vehicle tires, regardless of whether passenger car or truck tires are involved. Unfortunately, with tires constructed in this manner the effect is observed that the effectiveness of the pitch sequence deteriorates over the lifetime of the tire as wear occurs. In this connection, the amplitude of the low frequency vibrations, in other words the vibrations below the so-called block harmonic, increases relative to the higher frequency vibrations. The block harmonic is the product of the rotational frequency of the tire (essentially a function of vehicle speed and contact circumference) times the number of profiled blocks in the circumferential direction.

The present invention relates in particular to large-block tires for trucks and cross-country vehicles, where both of the aforementioned problems, and in particular irregular traction, are particularly problematic.

It is an object of the present invention, while maintaining the resonance-varying pitch sequence for the pneumatic vehicle tire profiling, to mitigate the aforementioned drawbacks.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The pneumatic vehicle tire tread of the present invention is characterized primarily in that also the inclination of the sides of the transverse grooves is subjected to the modulation of the pitch sequence that is utilized; stated more precisely, the tangent of the angle of the sides of the transverse grooves should also be modulated in conformity with the pitch sequence for the distance between successive transverse grooves and for the dimension of such grooves.

The inventive configuration ensures that the positive/negative distribution, which is uniform over the circumference, is also maintained after wear occurs. It was moreover discovered that with the present invention, the gradual increase of the low frequency excitation over the period of use was restricted. This is to be explained by the fact that the non uniformity of the positive/negative relationship that was established up to now over a period of use led to a gradual imbalance of the tire. In regions of large profiling blocks, not only was the specific wear greater (which remains basically unchanged with the present invention), but at the same time also the negative loss due to wear was less. By increasing the negative loss over the life of the tire between large profiling blocks, i.e. by an absolutely greater reduction of the negative volume over the use or life of the tire, this effect is restricted. Furthermore, deformations, caused by wear, of the pitch sequences designed for the periphery are eliminated.

Further specific features of the present invention will be described in detail subsequently.

DESCRIPTION OF PREFERRED EMBODIMENTS

Figure 1:
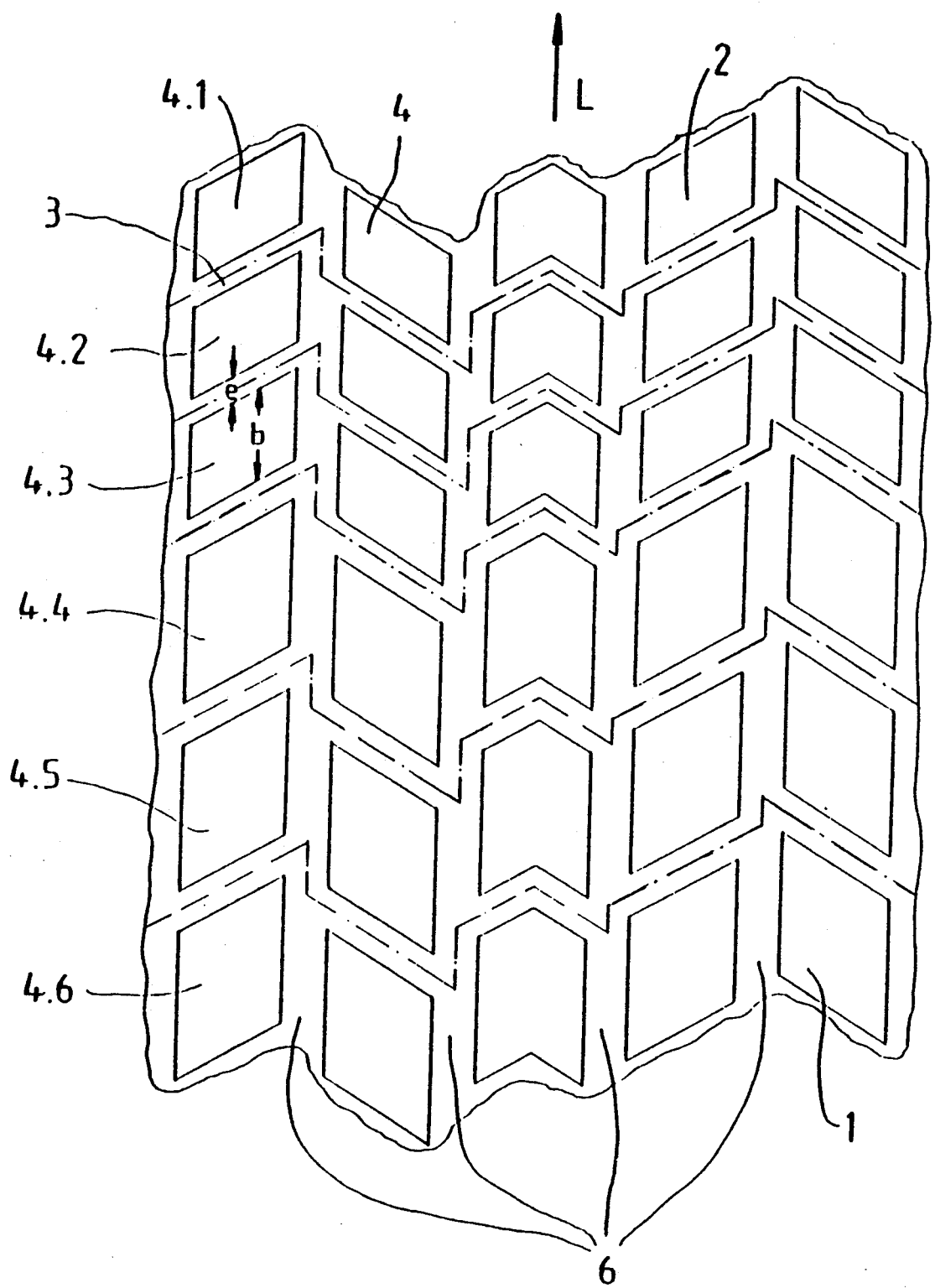
FIG. 1 is a plan view of a portion of one exemplary embodiment of the inventive pneumatic vehicle tire tread.

Referring now to the drawings in detail, FIG. 1 is a plan view of a portion of the tread surface 2 of a pneumatic vehicle tire 1 that is provided with grooves 3 that extend at an angle to the circumferential direction L. While the grooves 6, which will subsequently be called circumferential grooves, extend in the circumferential direction of the tire, the grooves 3, since they extend at an angle to the circumferential direction, will be called transverse grooves. Although the transverse grooves 3 can extend at an angle of 90° relative to the circumferential direction L, they need not necessarily do so. For example, in the illustrated embodiment the transverse groove 3 extend at an angle of approximately 60° relative to the circumferential direction L and define the pitch boundaries.

In the illustrated tread portion of FIG. 1, in the upper portion of the figure three short shaped or profiled blocks 4.1, 4.2 and 4.3 are shown in a given row of blocks, whereas in the lower portion of the figure three long profiled blocks 4.4, 4.5 and 4.6 are shown. In this embodiment, the pitch ratio is 1.6. The negative fraction, which pursuant to the present invention remains the same in each pitch independent of the length thereof, is 30%. In the illustrated embodiment, the rows 4 of blocks are separated from one another by linear circumferential grooves 6, although this is not critical for the present invention.

The dimension of the transverse grooves 3 in the circumferential direction is designated by the letter "e". The important thing is that the groove dimension "e" have a constant ratio to the block dimension "b", which is also taken in the circumferential direction. Thus, narrow grooves are disposed between small blocks, and wide grooves are disposed between large blocks, as can be seen in the lower portion of FIG. 1. Pursuant to the present invention, for the first time the constancy of the aforementioned ratio applies not only to the peripheral circumference but to every circumference row that is exposed to wear.

Figure 2:
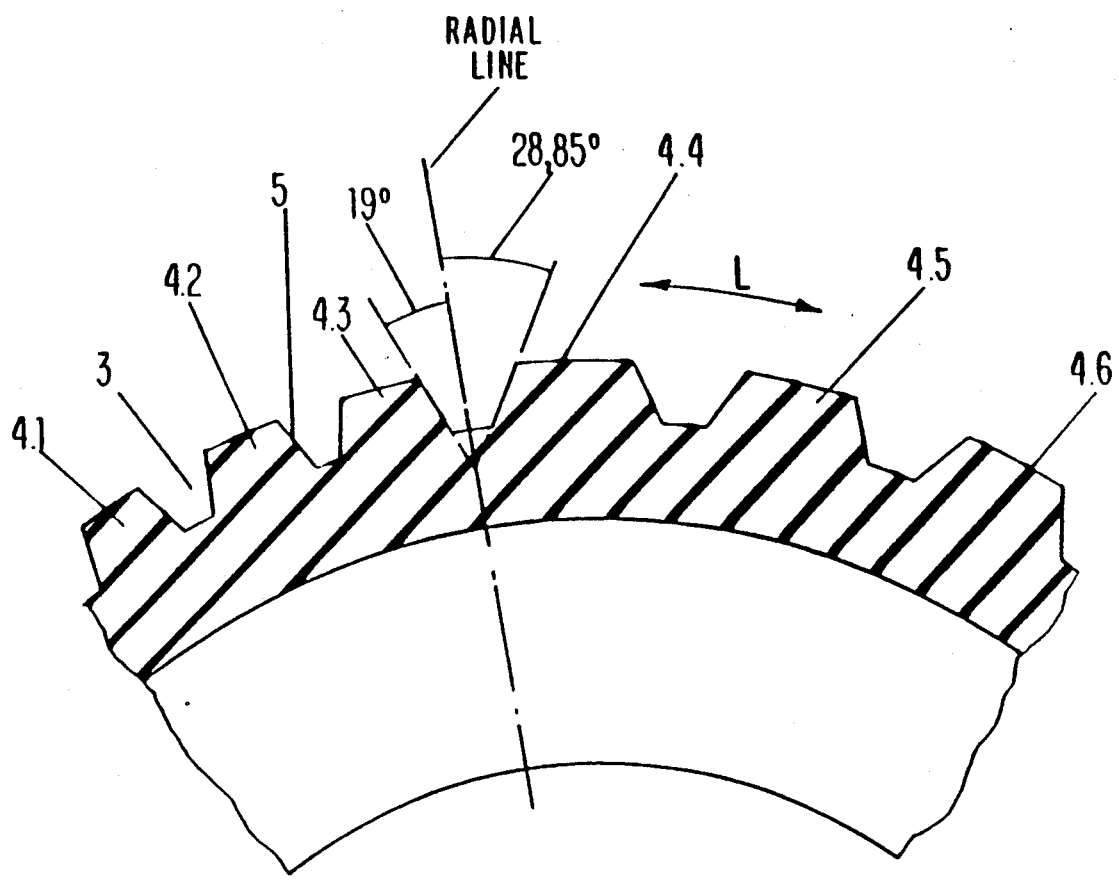
FIG. 2 is a longitudinal cross-sectional view through the tire tread portion of FIG. 1.

This can be seen particularly clearly from FIG. 2, which shows the same portion of the tire as is shown in FIG. 1, but is a cross-sectional view taken in the direction of the circumferential direction L. This figure shows the inclined flanks or sides 5 of the transverse grooves 3. As can be seen, the transverse grooves that are disposed between the large profiled blocks open more widely, i.e. at a greater angle, radially outwardly than do the transverse grooves that are disposed between the small blocks. For example, in the illustrated embodiment the sides 5 of the transverse grooves 3 disposed between the short blocks 4.1, 4.2 and 4.3 are inclined relative to a radial line by 19°, while the sides 5 of the transverse grooves 3 that are disposed between the long blocks 4.4, 4.5, 4.6 are inclined by about 28.85° relative to a radial line. The important think is that the length in the circumferential direction of the blocks have a constant ratio to the tangent of the angle of the transverse grooves, so that the tangent to the angle of the transverse grooves is modulated in conformance to the pitch sequence of the blocks.

What we claim is:

1. A profiled pneumatic vehicle tire comprising a tread surface that includes grooves that, when viewed in plan, extend at an angle relative to a circumferential direction of said tire, said grooves having sides that extend at an angel relative to a radial line, said tread surface being divided into a number of pitches, the dimension of at least two successive pitches in said circumferential direction being different, the width of said grooves in said circumferential direction differs, whereby for each pitch, the proportion of said dimension thereof in said circumferential direction to said width of the pertaining groove is the same, and the tangent of said angle of said sides of said grooves differs, whereby for each pitch, the proportion of said dimension thereof in said circumferential direction to the tangent of the angle of the pertaining groove is the same.

* * * * *